United States Patent [19]
Yuasa

[11] Patent Number: 5,871,282
[45] Date of Patent: *Feb. 16, 1999

[54] LINEAR MOTION ROLLING GUIDE UNIT WITH SEAL STRUCTURE

[75] Inventor: Kouhei Yuasa, Gifu, Japan

[73] Assignee: Nippon Thompson Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 509,113

[22] Filed: Aug. 1, 1995

[30] Foreign Application Priority Data

Aug. 9, 1994 [JP] Japan .................................. 6-209214

[51] Int. Cl.⁶ .......................... F16C 33/00; F16C 29/06; F16C 33/74; F16J 15/34
[52] U.S. Cl. .............................. 384/15; 384/44; 384/144; 277/95
[58] Field of Search .................................. 384/15, 43, 44, 384/45, 144; 277/38, 95

[56] References Cited

U.S. PATENT DOCUMENTS

| | | | |
|---|---|---|---|
| 4,428,629 | 1/1984 | Colanzi et al. | 384/144 |
| 4,437,673 | 3/1984 | Miyamoto | 277/38 |
| 4,832,511 | 5/1989 | Nisley et al. | 277/95 |
| 4,886,374 | 12/1989 | Osawa | 384/45 |
| 4,918,846 | 4/1990 | Tsukada | 384/15 |
| 5,149,205 | 9/1992 | Tsukada | 384/15 |
| 5,172,917 | 12/1992 | du Gay | 277/95 |
| 5,259,628 | 11/1993 | Nisley | 277/95 |
| 5,388,911 | 2/1995 | Agari | 384/15 |
| 5,464,288 | 11/1995 | Tanaka | 384/45 |
| 5,478,090 | 12/1995 | Simmons et al. | 277/95 |
| 5,492,412 | 2/1996 | Tsukada | 384/45 |

FOREIGN PATENT DOCUMENTS

| | | |
|---|---|---|
| 62-35945 | 9/1987 | Japan . |
| 1-82330 | 6/1989 | Japan . |
| 2070701 | 9/1981 | United Kingdom ..................... 384/15 |

*Primary Examiner*—Charles A. Marmor
*Assistant Examiner*—Matthew A. Kaness
*Attorney, Agent, or Firm*—Browdy and Neimark

[57] ABSTRACT

The linear motion rolling guide unit has a top seal secured to the casing which comprises sealing members facing side areas of the upper surface of the track rail. Each of the sealing members comprises a lip seal portion and a labyrinth seal portion. The lip seal portion is inclined outwardly toward the raceway grooves of the casing and its front end contacts the side area of the upper surface of the track rail. The labyrinth seal portion is arranged on a central area side of the lip seal portion and does not contact the side area of the upper surface of the track rail. Hence, the labyrinth seal portions of the top seal prevent foreign matters from entering into the raceway grooves and the lip seal portions prevent leakage of grease.

5 Claims, 2 Drawing Sheets

LINEAR MOTION ROLLING GUIDE UNIT WITH SEAL STRUCTURE

BACKGROUND OF THE INVENTION

1. Field of the Invention

The present invention relates to a linear motion rolling guide unit, which is applied to machine tools, industrial robots, precision machines and testing equipment and in which a slider comprising a casing and end caps is slidably mounted on a track rail through rolling elements.

2. Description of the Prior Art

The linear motion rolling guide unit generally has a slider mounted slidable on a track rail through rolling elements, the slider comprising a casing and end caps. To describe in more detail, the linear motion rolling guide unit comprises: a track rail having raceway grooves formed on both longitudinal sidewall surfaces thereof; a casing mounted slidable on the track rail and having raceway grooves formed therein that face the raceway grooves of the track rail; a pair of end caps attached to the longitudinal ends of the casing; rolling elements rolling between the opposing raceway grooves; end seals attached to the outer end surfaces of the end caps; under seals provided to the underside of the casing on both sides; and a top seal provided to the underside of the casing which faces the top surface of the track rail.

In the linear motion rolling guide unit, foreign matters such as dirt, dust and chips, once they adhere to the raceway grooves of the track rail and slider, block the smooth running of the rolling elements as the slider slides on the track rail, and will eventually damage the raceway grooves shortening the life of the product. To prevent this, the linear motion rolling guide unit has end seals, under seal and top seal as sealing means between the slider and the track rail.

Of the sealing means, the end seals effectively remove foreign matters adhering to the top surface of the track rail. When foreign substances collect in bolt holes in the track rail, it is difficult to remove them completely by the end seals. Foreign matters that have moved past the end seals are scattered inside the slider and may enter into the raceway grooves where the rolling elements are running. To prevent the foreign matters that have passed the end seals unhindered from entering into the raceway grooves, a top seal is provided.

The raceway grooves of the track rail and the slider are supplied with grease. When grease adheres to the upper surface of the track rail, foreign matter sticks to the upper surface of the track rail and becomes difficult to remove by the end seals alone. The linear motion rolling guide unit has the top seal to prevent grease in the raceway grooves from leaking into the top surface of the track rail. The top seal has two functions of preventing foreign matters from entering the raceway grooves and of preventing grease from leaking into the top surface of the track rail.

A known conventional top seal consists, for example, of a flat elongate plate and a single rubber lip secured to the edge of the plate and extending longitudinally. The lip is inclined outwardly toward the raceway grooves of the casing, with the end of the lip pressed against the top surface of the track rail by its own elastic force (Japan Patent Utility Model Publication No. 35945/1987, for instance).

Because of its outwardly inclined lip, the conventional top seal can prevent grease from leaking into the top surface of the track rail and also keep foreign matters from entering into the raceway grooves. The sealing performance of the top seal, however, is not sufficient because the lip has a single structure. For example, when a large foreign substance strikes the lip, it pushes the lip open and enters into the raceway grooves. Further, because it is made of an elastic material and its end is formed thin, the lip may be damaged by foreign matters. Possible countermeasures may include increasing the number of lips in the top seal to increase the sealing area and to make the passage of foreign matters difficult by the increased number of lips. This, however, results in an increase in the sliding resistance, making it difficult for the slider to follow a high-speed sliding motion.

Another example of the conventional top seal is a seal plate that extends longitudinally of the track rail and has an almost rectangular lateral cross section, and which is directly secured to the underside of the slider that opposes the upper surface of the track rail in such a way that the underside of the top seal does not contact the upper surface of the track rail, leaving a small gap between them. This top seal may be formed of a metal, plastics or synthetic rubber (Japan Patent Utility Model Laid-Open No. 82330/1989, for example).

Although the top seal has the advantage of zero sliding resistance because it (i.e., seal plate) is not in contact with the track rail, its sealing performance cannot be said to be sufficient in terms of grease leakage. Because there is a small gap between the underside of the seal plate and the upper surface of the track rail, fine foreign matters can pass through the gap into the raceway grooves. Another problem is that when the seal plate is made of a metal, foreign matters may get seized in the gap increasing the sliding resistance of the slider enormously.

SUMMARY OF THE INVENTION

An object of this invention is to solve the above-mentioned problems and to provide a linear motion rolling guide unit that has a top seal, which can accomplish two functions simultaneously of preventing foreign matters from entering the raceway grooves and of preventing leakage of grease; which has a small sliding resistance despite its having at least one pair of sealing portions and can exhibit excellent sealing performance regardless of the size of foreign matters; and which are not easily damaged by foreign matters.

In more concrete terms, the object of this invention is to provide a linear motion rolling guide unit which comprises:

a track rail having first raceway grooves formed on longitudinally extending side wall surfaces thereof;

a casing slidable relative to the track rail and having second raceway grooves formed at positions facing the first raceway grooves;

end caps mounted to the longitudinal ends of the casing;

rolling elements circulating between the opposing first and second raceway grooves;

end seals attached to outer end surfaces of the end caps;

under seals provided to the underside of the casing on both sides; and a top seal mounted to the underside of the casing that faces the upper surface of the track rail, the top seal comprising a plate longitudinally extending along edges of the underside of the casing and seal members made of an elastic material, the seal members being secured to the plate and facing side areas of the upper surface of the track rail;

wherein the seal members comprise lip seal portions that are inclined outwardly toward the second raceway grooves of the casing and whose front ends contact the side areas of the upper surface of the track rail, and labyrinth seal portions arranged on a central area side of the lip seal portions and not contacting the side areas of the upper surface of the track rail.

Because the linear motion rolling guide unit has the lip seal portions and the labyrinth seal portions, foreign matters that have passed the end seals and entered into the slider can be prevented from further entering into the raceway grooves by the action of the labyrinth seal portions and at the same time grease filled into the raceway grooves can be prevented from leaking onto the upper surface of the track rail by the action of the lip seal portions.

As the pressure in the raceway grooves is increased by the supplied grease, the lip seal portions on the outer side are pressed more strongly against the upper surface of the track rail to enhance the sealing performance, thereby effectively blocking the leakage of grease onto the upper surface of the track rail from the raceway groove side.

The gap between the underside of the labyrinth seal portion and the upper surface of the track rail is set very small, so that foreign matters can be reliably prevented from entering into the raceway groove side. If foreign matters should pass the labyrinth seal portions, the foreign matters, which are very small, are prevented from entering into the raceway groove side by the action of the lip seal portions. The top seal therefore can achieve two functions simultaneously—a foreign matter ingress prevention function and a grease leakage prevention function.

The labyrinth seal portion is thicker than the lip seal portion and has greater strength against deformation. The labyrinth seal portion therefore is not easily damaged when struck with sharp foreign matters and thus maintains good sealing performance. If foreign matters pass the labyrinth seal portions, which has the function of blocking the entrance of foreign substances, the foreign matters must be very small and thus can be prevented completely from entering into the raceway grooves by the lip seal portions.

Of the two sealing portions of the sealing member, only the lip seal portion makes sliding contact with the upper surface of the track rail and the labyrinth seal portion remains out of contact with the upper surface of the track rail. This structure makes the sliding resistance small. Because the sealing member is formed of an elastic material, if foreign matters get trapped in the gap between the underside of the labyrinth seal portion and the upper surface of the track rail, the labyrinth seal easily deforms preventing the sliding resistance of the slider from becoming abnormally large.

Further, because the sealing members of the top seal are fixed to the edges of the flat plate mounted to the underside of the casing and the plate is not bent, the linear motion rolling guide unit can be reduced in thickness. The plate is formed of a flat plate and fastened to the underside of the casing as by bolts, so that the mounting of the top seal to the slider can be done after assembly of the slider and therefore with ease. Another advantage is that the front end of the lip seal portion is pressed against the upper surface of the track rail by the elasticity of the lip seal portion, which makes the sealing performance of the top seal almost independent of the fabrication precision of the plate. This means there are almost no variations in sealing performance between the products.

DETAILED DESCRIPTION OF EMBODIMENTS

Figure 1:
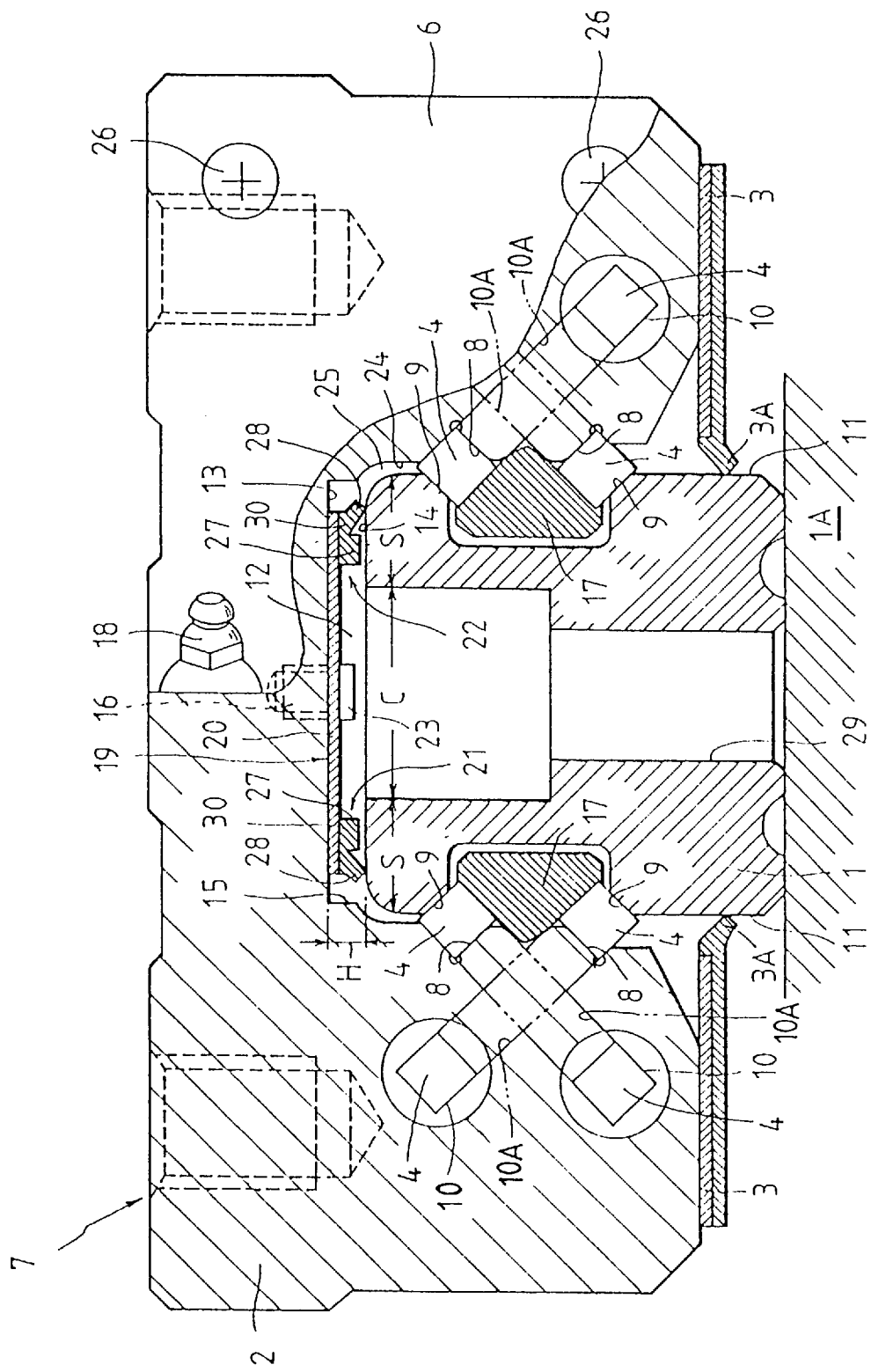
FIG. 1 is a partly cutaway lateral cross section of one embodiment of the linear motion rolling guide unit according to this invention.
Figure 2:
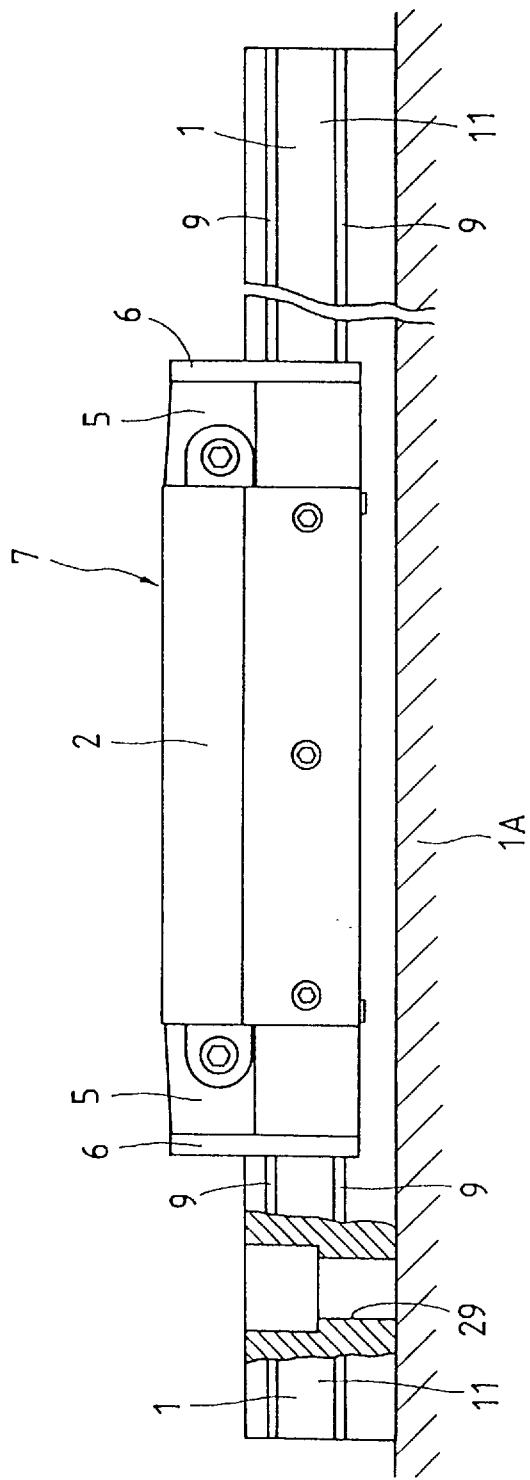
FIG. 2 is an explanatory diagram showing the outline of the linear motion rolling guide unit of FIG. 1.

One embodiment of the linear motion rolling guide unit of this invention will be described by referring to the accompanying drawings. FIG. 1 shows one embodiment of a type that uses rollers for the rolling elements 4. It is noted that this invention can also be applied to a type that uses balls instead of rollers.

This linear motion rolling guide unit includes a track rail 1 securely mounted on a base 1A and having two longitudinally extending raceway grooves 9 formed on each of sidewall surfaces 11, and a slider 7 slidably mounted a stride the track rail 1. An upper surface 14 of the track rail 1 is formed with bolt holes 29 through which to pass mounting bolts to secure the track rail 1 to the base 1A. The slider 7 is slidable relative to the track rail 1, and includes a casing 2 having raceway grooves 8 formed at positions that face the corresponding raceway grooves 9, rolling elements 4 in the form of rollers that roll between the opposing raceway grooves 8, 9 to allow relative motion between the casing 2 and the track rail 1, end caps 5 attached to the longitudinal ends of the casing 2, the longitudinal direction representing a direction in which the casing 2 slides, and a sealing device for sealing between the slider 7 and the track rail 1.

The slider 7 is mounted astride and slides along the track rail 1 with the rolling elements 4 interposed between them. The rolling elements 4 are rollers circulating along the raceway grooves 9 of the track rail 1. The rolling elements 4 running under load through the raceway grooves 9 of the track rail 1 are let into direction change paths 31 formed in the end caps 5 and further into return paths 10 formed in the casing 2 so as to be parallel to the raceway grooves 8. The rolling elements 4 circulate endlessly through the endless circulation paths. The rolling motion of the rolling elements 4 loaded between the raceway grooves 8 of the slider 7 and the raceway grooves 9 of the track rail 1 allows the slider 7 to slide relative to the track rail 1.

The rolling elements 4 are kept in the casing 2 by retainer members 17. That is, both inner sidewall surfaces 24 of the casing 2 are each formed with two raceway grooves 8, 8 and, to prevent the rolling elements 4 from coming off the casing 2, the retainer members 17 having an almost triangular cross section are mounted to the casing 2 so as to hold two series of rolling elements 4 between the retainer member 17 and the inner sidewall surface 24 of the casing 2.

The sealing device in the linear motion rolling guide unit comprises: end seals 6 attached to the end surfaces of the end caps 5; under seals 3 provided to the underside of the casing 2 and the end caps 5 on both sides; and a top seal 19 provided between the underside 13 of the casing 2 of the slider 7 and the upper surface 14 of the track rail 1.

The end seals 6 are attached to the end surfaces of the end caps 5 and fastened to the casing 2 along with the end caps 5 by screws 26. The end surfaces of the end seals 6 are provided with a grease nipple 18, through which grease is supplied to a storage chamber 25 in the casing 2 to lubricate the opposing raceway grooves 8, 9. The end seals 6 have a sealing portion (not shown) that are in sliding contact with sidewall surfaces 11 of the track rail 1 and with the raceway grooves 9. The end seals 6 also have a sealing projection (not shown) that is in sliding contact with the upper surface of the track rail 1 and is inclined outwardly.

The under seals 3 provide a vertical seal for the track rail 1, the casing 2 and the end caps 5. The under seals 3 have a seal projection 3A secured to one edge of a flat steel plate as by baking and are mounted to the underside of the slider 7 on each side. With the under seals 3 mounted to the underside of the slider 7, the seal projections 3A incline downwardly and slidably contact the sidewall surfaces 11 of the track rail 1.

The top seal 19 is provided between the underside 13 of the casing 2 of the slider 7 and the upper surface 14 of the track rail 1. The underside 13 of the casing 2 that forms the slider 7, that is, the underside 13 of a hollow portion 12 inside the casing 2 is formed with a recessed groove 15 that faces the upper surface 14 of the track rail 1. The underside 13 of the casing 2 is formed with a mounting hole 16 on the center line.

The top seal 19 comprises a plate 20 mounted to the underside 13 of the casing 2 and extending longitudinally along the edges of the underside 13 of the casing 2; and a pair of sealing members 21, 22 secured to both edges of the plate 20 as by baking. The plate 20 is formed of a flat metal plate. The plate 20 extends over the underside 13 of the casing 2 of the slider 7 and the underside of the end caps 5, with the end surfaces of the plate 20 in sealing contact with the end seals 6. The sealing members 21, 22 are formed of an elastic material and face both side areas of the upper surface 14 of the track rail 1.

The top seal 19 is mounted to the underside 13 of the slider 7, with the plate 20 of the top seal 19 fitted in the recessed groove 15 of the casing 2 in such a way that the hole in the plate 20 and the mounting hole 16 in the casing 2 are aligned. A bolt 23 is passed through these aligned holes and fastened to secure the top seal 19 to the underside 13 of the slider 7. Mounting of the top seal 19 to the slider 7 may be done after assembly of the slider 7. The recessed groove 15 formed in the underside 13 of the casing 2 allows the linear motion rolling guide unit to reduce its thickness while securing the distance H between the plate 20 and the upper surface 14 of the track rail 1.

The sealing members 21, 22 of the top seal 19 are formed of elastic material such as rubber and plastic. When engineering plastics is used as the material, the sealing members 21, 22 and the plate 20 may be integrally formed of the engineering plastics. The sealing members 21, 22 are located to face the side areas S of the upper surface of the track rail 1, and extend longitudinally of the track rail 1. The sealing members 21, 22 each have a lip seal portion 28 and a labyrinth seal portion 27. The lip seal portion 28 extends from a base portion 30 on the plate 20 toward the raceway grooves 8 in the casing 2 and inclines outwardly, and its front end contacts the side area portion S of the upper surface 14 of the track rail 1. The labyrinth seal portion 27 is arranged on the center area C side of the lip seal portion 28 and does not contact the side area S of the upper surface 14 of the track rail 1.

The labyrinth seal portion 27 is rectangular in cross section and has its underside formed flat and parallel to the upper surface of the track rail. Because it is rectangular in cross section and thick, the labyrinth seal portion 27 has high strength against deformation, so that it is not easily damaged even when struck with sharp foreign matters. The gap between the underside of the labyrinth seal portion 27 and the upper surface 14 of the track rail 1 is very small. The elastic material, of which the labyrinth seal portion 27 is formed, prevents the sliding resistance of the slider 7 from increasing abnormally even when small foreign matters are trapped in the gap between the underside of the labyrinth seal portion 27 and the upper surface of the track rail 1.

Because the lip seal portion 28 is formed of an elastic material and is made long to allow easy deformation, the force with which the lip end of the lip seal portion 28 presses against the upper surface 14 of the track rail 1 is relatively small. Hence, the slider 7 can move with a small sliding resistance and perform high-speed motion.

Next, we will explain the sealing function of the sealing device in this linear motion rolling guide unit. Because the end seals 6 are attached to the outer end surfaces of the end caps 5, foreign matters adhering to the track rail 1 are prevented from entering between the upper surface 14 of the track rail 1 and the underside 13 of the slider 7 and between the sidewall surfaces 11 of the track rail 1 and the inner sidewall surfaces 24 of the slider 7. If foreign matters should enter into the interior of the slider 7 from the upper surface 14 of the track rail 1, they are discharged from the end seals 6 to the outside. That is, because the seal projections of the end seals 6 are inclined outwardly, the foreign matters that have entered into the slider 7 are discharged outside from the end seals 6 as the slider 7 moves.

Foreign matters that may enter into the raceway groove from the base 1A are blocked by the under seals 3. If foreign matters should enter into the slider 7 from the under seals 3, they are discharged outside from the under seals 3. That is, as the storage chamber 25 is supplied with grease and air and its interior pressure increases, the foreign matters are discharged outside along with grease through the seal projection 3A of the under seal 3 that is inclined downwardly. Discharging the grease from the under seals 3 poses no problem.

Further, when foreign matters get between the upper surface 14 of the track rail 1 and the under-side 13 of the slider 7, they are prevented from entering into the raceway grooves 8, 9 by the labyrinth seal portion 27 of the top seal 19. If foreign matters should pass through a gap between the underside of the labyrinth seal portion 27 and the upper surface 14 of the track rail 1, the foreign matters, which is very small, can be prevented completely from entering into the raceway grooves 8, 9, this time, by the lip seal portion 28.

As the grease supplied from the grease nipple 18 increases the pressure in the raceway grooves 8, 9, the lip seal portion 28 is pressed more strongly against the upper surface 14 of the track rail 1, which in turn enhances the effectiveness of preventing the grease leakage toward the upper surface 14 of the track rail 1 from the raceway grooves 8, 9. Because the grease does not leak onto the upper surface 14 of the track rail 1, foreign matters adhering to the upper surface 14 of the track rail 1 are easily wiped away by the seal projection of the end seals 6.

Furthermore, because a pressure as supplied by grease presses the lip seal portion 28 strongly against the upper surface 14 of the track rail 1 to enhance the sealing performance of the lip seal portion 28, if foreign matters enter from the labyrinth seal portion 27, their further ingress into the raceway grooves 8 and 9 is effectively blocked by the lip seal portion 28. In this way, the top seal 19 can achieve the foreign matter ingress prevention function and the grease leakage prevention function simultaneously.

While in the above embodiment, description concerns the structure having one lip seal portion 28, the invention can also be applied to a structure having two or more lip seal portions 28. Although the underside of the labyrinth seal portion 27 in the above embodiment is formed flat, the underside may be formed with projected strips extending longitudinally of the track rail 1. The above embodiment has the end seals 6 each attached to each of outer end surfaces of the end caps 5. To completely prevent grease leakage from the end surfaces of the slider 7, it is possible to attach two or more end seals 6 to each of outer end surfaces of the end caps 5. In that case, half the end seals 6 are preferably mounted so that their seal projections face in a direction opposite to that of the seal projections of the remaining end seals. In this construction, the foreign matters are discharged from the under seals 3.

What is claimed is:

1. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to longitudinal ends of the casing;
   rolling elements circulating between the opposing first and second raceway grooves;
   a pair of end seals attached to outer end surfaces of the end caps;
   under seals provided to an underside of the casing both on sides of the casing; and
   a top seal fitted in a recessed groove formed on the underside of the casing that faces an upper surface of the track rail, the top seal comprising a plate longitudinally extending between the end seals along the recess groove of the underside of the casing and a pair of seal members made of elastic material, the seal members being secured to the plate and facing side areas of the upper surface of the track rail;
   wherein the plate is formed of a flat plate secured to the recessed groove formed on the underside of the casing;
   wherein the seal members comprise lip seal portions that are inclined outwardly toward the second raceway grooves of the casing and whose front ends contact the side areas of the upper surface of the track rail, and labyrinth seal portions arranged on a central area side of the recessed groove and in the proximity of the lip seal portions and not contacting the side areas of the upper surface of the track rail, and the lip seal portions and the labyrinth seal portions together are of a one-piece construction with each other;
   wherein the labyrinth seal portions are formed thicker than the lip seal portions and have greater strength against deformations than the lip seal portions; and
   wherein the labyrinth seal portions include means to prevent foreign matter that has passed the end seals and entered into the casing from further entering into both of the first and second raceway grooves, and the lip seal portions include means to prevent grease filled in the raceway grooves from leaking onto the upper surface of the track rail.

2. The linear motion rolling guide unit according to claim 1 wherein the plate forming the top seal is a core made of a metal and the seal members secured to the plate are made of synthetic rubber.

3. The linear motion rolling guide unit according to claim 1 wherein the plate forming the top seal is a core made of metal and the seal members secured to the plate are made of plastics.

4. The linear motion rolling guide according to claim 1, wherein the labyrinth seal portions are thick and rectangular in cross section.

5. The linear motion rolling guide according to claim 1, wherein the labyrinth seal portions include elastic material.

* * * * *